United States Patent [19]

Esselborn et al.

[11] Patent Number: 4,668,570

[45] Date of Patent: May 26, 1987

[54] LACQUERING PROCESS USING NACREOUS PIGMENTS

[75] Inventors: Reiner Esselborn, Darmstadt; Klaus Ambrosius, Frankfurt am Main; Hans-Joachim Graetz; Manfred Letsch, both of Wuppertal, all of Fed. Rep. of Germany

[73] Assignees: Merck Patent Gesellschaft mit beschraenketer Haftung, Darmstadt; Herberts GmbH, Christbusch, both of Fed. Rep. of Germany

[21] Appl. No.: 875,520

[22] Filed: Jun. 19, 1986

Related U.S. Application Data

[63] Continuation of Ser. No. 654,596, Sep. 26, 1984, abandoned, which is a continuation of Ser. No. 472,309, Mar. 4, 1983, abandoned.

[30] Foreign Application Priority Data

Mar. 5, 1982 [DE] Fed. Rep. of Germany ....... 3207936

[51] Int. Cl.$^4$ ........................... B32B 5/16; B05D 3/02
[52] U.S. Cl. ................................. 428/324; 427/407.1; 427/409; 428/327; 428/328
[58] Field of Search .............................. 427/407.1, 409; 428/324, 327, 328

[56] References Cited

U.S. PATENT DOCUMENTS

| 3,087,827 | 4/1963 | Klenke, Jr. et al. ............... 106/291 |
| 4,039,713 | 8/1977 | Vassiliou ............................ 428/324 |
| 4,128,435 | 12/1978 | Bäumer et al. ..................... 106/148 |

FOREIGN PATENT DOCUMENTS

| 253087 | 3/1967 | Austria . |
| 2852585 | 6/1980 | Fed. Rep. of Germany . |

*Primary Examiner*—Thurman K. Page
*Attorney, Agent, or Firm*—Millen & White

[57] ABSTRACT

Base lacquers suitable for use in multi-layer lacquerings containing a layer of base lacquer and a layer of clear lacquer on top of this, contain a nacreous pigment based on mica flakes coated with metal oxides, wherein the nacreous pigments have a particle size substantially in the range between 5 and 25 μm. The resultant lacquerings have advantageous properties.

19 Claims, No Drawings

LACQUERING PROCESS USING NACREOUS PIGMENTS

This application is a continuation of application Ser. No. 654,596, filed Sept. 26, 1984 now abandoned, which is a continuation of Ser. No. 472,309 filed Mar. 4, 1983 now abandoned.

BACKGROUND OF THE INVENTION

The present invention relates to a process for lacquering objects with a multi-layer lacquering containing a layer of base lacquer and a layer of clear lacquer on top of this, the base lacquer containing at least one nacreous pigment based on mica flakes coated with metal oxides.

Nacreous pigments have hitherto been used for a number of applications, in particular in cosmetics. Nacreous pigments have also been proposed for use in automobile lacquers; however, it has not yet been possible to achieve a wide application in this field, despite the particularly interesting and attractive lacquerings made possible because of the optical properties of nacreous pigments. Apart from the fashion considerations, this is due to the particularly high quality requirements imposed on automobile lacquers, which, according to their intended use, are in some cases exposed to extreme weather conditions over long periods of time.

The color of nacreous pigments based on mica flakes coated with metal oxides is based on interference phenomena in the reflection of the incident light at the thin layer of metal oxide. Since the interference depends on the angle of the incident light or the viewing angle, as far as possible, the pigments must be aligned parallel in the layer of lacquer. It is also known that diffuse light scattering leading to a whitening of the color and to a loss in gloss and color intensity occurs at each corner or edge of a pigment particle. Both plane-parallel alignment of the pigment particles, which must take place at the moment at which the lacquer is applied to the surface to be lacquered, and the gloss and tinctorial strength of the pigments are favored by using pigment particles with a relatively large main diameter.

Thus, above all, nacreous pigments with particle sizes of about 10–70 $\mu$m, most of the particles being in the order of size of about 30 to 50 $\mu$m, have hitherto been used in lacquers and paints in which high gloss and high tinctorial strength were desirable. Although these pigments are particularly suitable for very many applications, nevertheless, surprisingly, the results obtained when they are used in automobile lacquers are not good. Rather, where polycondensation systems customary in series lacquering are used, it is found that customary nacreous pigments produce lacquers with a poor clear lacquer quality and a relatively rough surface which therefore has poor gloss.

SUMMARY OF THE INVENTION

It is, therefore, an object of this invention to provide pigments which can be incorporated into automobile lacquers for series lacquering and which have, in particular, an improved lacquer quality.

Upon further study of the specification and appended claims, further objects and advantages of this invention will become apparent to those skilled in the art.

These objects have been achieved by using in such lacquers nacreous pigments with a particle size distribution in which the particles are substantially in the range from about 5 to about 25 $\mu$m in size. This is surprising, since in the application of the lacquer, for example, by the spraying method, flow processes in the lacquer which achieve the alignment of the pigment particles parallel to the surface take place only for a very short time. It could therefore only be presumed that complete orientation would no longer take place with smaller particles, which don't align as easily as larger particles. The particles would therefore be expected in some cases to be perpendicular to the surface. Some of the particles would stand out from the surface and the quality of the clear lacquer would be impaired. In fact, however, the opposite is observed; i.e., the quality of the clear lacquer is significantly improved in comparison with that obtained using larger particles.

This invention thus relates to a process for lacquering objects with a multi-layer lacquering containing a layer of base lacquer and a layer of clear lacquer on top of it, the base lacquer containing at least one pearlescent pigment based on mica flakes coated with metal oxides, wherein the nacreous pigments have a particle size substantially of 5 to 25 $\mu$m.

The invention also relates to a base lacquer, suitable for use in a multi-layer lacquering containing a layer of base lacquer, wherein the base lacquer is pigmented with nacreous pigments which are based on mica flakes coated with metal oxides and have a particle size substantially of 5 to 25 $\mu$m.

The invention further relates to the use of nacreous pigments which are based on mica flakes coated with metal oxides and have a particle size substantially of 5 to 25 $\mu$m for pigmenting base lacquers useful in a multi-layer lacquering containing a layer of base lacquer and a layer of clear lacquer.

DETAILED DISCUSSION

A primary advantage of the process according to this invention is the improved quality of the clear lacquer in the layers of lacquer produced by the process. In addition to the use of pigments with a small particle size, the use of a relatively narrow band of particle sizes is essential for this. At least 60% of the particles, but preferably at least 80% of the particles, are within the range of 5 to 25 $\mu$m. Although higher amounts of particles less than 5 $\mu$m in size lead to lacquer layers with reduced gloss and reduced coloring power, they do not impair the quality of the clear lacquer. Thus, downward deviations in the pigment diameter are entirely tolerable. However, it is important that the upper limit of the range be clearly defined. Thus, preferably, less than 0.5% of the particles have a diameter of more than 40 $\mu$m, and if possible it should be ensured that as far as possible no particles at all exceed this diameter.

The nacreous pigments used consist of lamella-like or flake-like particles which are relatively thin in relation to their length and width. The particle diameter referred to here is therefore the largest diameter formed by the length or width of the particles.

The pigments used are known per se, or can be prepared by known processes. Such processes are described, for example, in German Patent Specification Nos. 1,467,468 and 2,009,566, whose disclosures are entirely incorporated by reference herein. In these processes, mica platelets are coated with a layer of metal oxides, in particular titanium dioxide, in a thickness suitable for producing interference colors of the first, second or even higher order. In addition to titanium dioxide, these pigments can also contain additives comprising other colorless or colored metal oxides in the layer or on top of it, or they can be stabilized against weather influences by pre- or after-treatments, and provided with colored coatings. Such pigments are described, for example, in German Offenlegungsschriften Nos. 2,244,298, 2,313,331, 2,313,332, 2,429,762, 2,522,573, 2,928,287, 2,060,850, 2,106,613 and 2,215,191. In view of their use in automobile lacquers, the rutile pigments according to German Offenlegungsschriften Nos. 2,214,545 and 2,522,472, which are especially stable to light and weather conditions, are particularly preferred. All the mentioned references are entirely incorporated by reference herein.

In order to obtain the pigments in the particle size according to this invention, the starting material, as a rule white mica of the muscovite type, is obtained by simply grinding and classifying it into the desired particle size distribution. Since the particle diameter is scarcely changed by the coating with metal oxides, this particle size distribution is virtually identical to that of the pigment obtained therefrom.

The pigments thus obtained can then be incorporated into conventional lacquer systems in the customary manner. See, e.g., W. A. MORGANS, Outlines of paint technology, Griffin & Co., London, First Edition 1969, Second Edition 1982, whose entire disclosure is incorporated by reference herein.

A lacquer which dries physically in 1–15 minutes is as a rule used. It contains, as binders, oil-free or oil-containing polyesters or thermosetting acrylate resins, if appropriate as a mixture with melamine resins. These are customarily used in series lacquering in automobile factories or repair shops. In addition to these binders, it is also possible to use cellulose ethers and/or esters of half-esters, in particular cellulose acetobutyrate. The binders and other lacquer additives and solvents which are required to complete the recipe are familiar to the expert. In particular, the lacquers can be prepared analogously to the compositions customary for lacquers on a metallic basis.

The lacquers according to this invention contain mica pigments, and not aluminum bronzes, for production of a metallic effect. These pigments are as a rule added in an amount of about 0.5 to about 10% by weight, based on the base lacquer at the application viscosity (usually 16–18 seconds, Din A4), or 5 to 30% by weight, based on the total solids content in the base lacquer.

In addition to the nacreous pigments, other transparent colored pigments can also be added to the lacquer. If a color different from that of the interference color of the nacreous pigment is chosen for this, this leads to interesting iridescent effects. The color of the colored pigment or the interference color of the nacreous pigment can dominate, depending on the angle of viewing.

The lacquers according to this invention can be applied in the same manner as the conventional lacquers, for example, by electrostatic or conventional spraying processes. As a rule, the base lacquer containing the nacreous pigments is applied in layer thicknesses of about 10 to 30 $\mu$m. After exposure to air for 2 to 5 minutes—as is customary in the automobile industry—a layer of clear lacquer about 20–40 $\mu$m thick is then applied to the base lacquer of this invention. After stoving under the conditions customary in the automobile industry of 30 to 20 minutes at 120° to 150° C., the lacquerings are ready for use. The quality of the clear lacquer in the lacquering is very good, so that a substantial advance in the field of automobile lacquers is achieved with the present invention.

Unless indicated otherwise herein, the preparation of the lacquers of this invention and their use are fully conventional, e.g., as disclosed in U. BIETHAN et al, Lacke and Lösemittel; Eigenschaften, Herstellung, Anwendung; Verlag Chemie, Weinheim, New York, 1979, whose disclosures are incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The following colored pigment pastes are used in the examples.

1. Black paste 1

45 parts of cellulose acetobutyrate, 20% in butyl acetate; 24 parts of Dynapol H 704, 65% in xylene; 6 parts of Maprenal MF 600, 55% in butanol/xylene; 5 parts of Spezialschwarz IV; 9 parts of butyl acetate; 11 parts of xylene 2. Black paste 2

Composition as for black paste 1, but it contains 5 parts of Russ FW 200 instead of 5 parts of Spezialschwarz IV 3. White paste 32 parts of titanium dioxide, Titan RN 59; 39.2 parts of cellulose acetobutyrate, 20% in butyl acetate; 25.6 parts of Dynapol H 704, 65% in xylene; 3.2 parts of xylene 4. Blue paste 1

9 parts of Irgazinblau 3 GT; 45 parts of cellulose acetobutyrate, 20% in butyl acetate; 24 parts of Dynapol H 704, 65% in xylene; 12 parts of butyl acetate, 10 parts of xylene 5. Blue paste 2

10 parts of Paliogenblau L 6470; 50 parts of cellulose acetobutyrate, 20% in butyl acetate; 26 parts of Dynapol H704, 65% in xylene; 9 parts of butyl acetate; 5 parts of xylene

EXAMPLE 1

15.5 parts of Additol XL 450, 1 part of Maprenal MF 600, 25% in butanol/xylene, and 10.3 parts of Dynapol H 704, 65% in xylene, are added to 14.75 parts of cellulose acetobutyrate, 20% in butyl acetate. 18.5 parts of a 6% AC-Copolymer 405 solution in butyl acetate/xylene are added, as well as 4.5 parts of a 50% Ultramoll 1 solution in xylene, 0.3 part of Baysilon oil OL, 10% in xylene, 3.5 parts of GB-ester and 1.5 parts of ethylglycol. 25 parts of black paste 2 are then mixed with these components, and 5 parts of a rutile pigment which is prepared by the process of German Offenlegungsschrift No. 2,522,572, has a green interference color and has a particle size distribution in which at least 80% of the particles are within the range from 5 to 15 $\mu$m (mica 26%, $TiO_2$ 70.5%, $SnO_2$ 3.5%) are stirred in. The base lacquer thus obtained can be applied by the conventional or electrostatic spraying process, after dilution with 85% butyl acetate to 16–18 seconds DIN A 4. After exposure to air for 3 to 6 minutes, this base lacquer is over-lacquered with a layer of a melamine/acrylic resin clear lacquer 30 to 40 $\mu$m thick, and the lacquering is stoved under conditions of 30 to 20 minutes at 120° to 150° C. The coating obtained with this lacquer exhibits a very, very good clear lacquer quality and a green/black iridescent effect.

EXAMPLE 2

A base lacquer is mixed analogously to Example 1, but, instead of black paste 2, it contains the same amount by weight of black paste 1. Instead of the green interference pigment, it contains 5 parts of a copper-colored rutile pigment which is prepared according to German Offenlegungsschrift No. 2,522,572 and has a particle size distribution in which at least 80% of the particles are within the range from 5 to 15 $\mu$m (mica 39%, $TiO_2$ 56%, $SnO_2$ 5%). The layers of lacquer, which are applied according to Example 1, exhibit a good clear lacquer quality and a black/copper iridescent effect.

EXAMPLE 3

15.5 parts of Additol XL 460, 2.1 parts of Maprenal MS 600, 55% in butanol/xylene, and 8.5 parts of Dynapol H 704, 65% in xylene, are added to 11 parts by weight of cellulose acetobutyrate, 20% in butyl acetate. 17 parts of AC-Copolymer, 4.35 parts of Ultramoll 1, 4 parts of GB-ester, 1.5 parts of ethylglycol and 0.3 part of Baysilon oil OL are then added. 20.25 parts of blue paste 2, 4.5 parts of blue paste 1, 0.75 part of white paste and 5 parts of a gold pigment which is prepared according to German Offenlegungsschrift No. 2,522,572 and has a particle size distribution in which at least 80% of the particles are within the range from 5 to 15 $\mu$m (mica 43%, $TiO_2$ 51%, $SnO_2$ 6%) are then added, while stirring. Application according to Example 1 gives a lacquer with a very good clear lacquer quality and blue/gold iridescent effect.

The trademarks used in the examples are as follows:

| | |
|---|---|
| Dynapol H 704 | saturated polyester resin with an OH number of 80–120 from Dynamit-Nobel AG |
| Maprenal MF 600 | butylated melamine resin of high reactivity from Hoeschst AG |
| Spezialschwarz IV | fine carbon black with a particle size of about 0.1 $\mu$m |
| Russ FW 200 | fine carbon black with a particle size of about 0.1 $\mu$m from Degussa |
| Titan RN 59 | titanium dioxide, rutile form, stabilized, from Titangesellschaft |
| Irgazinblau 3 GT | organic blue pigment transparent ground from Ciba-Geigy AG |
| Paliogenblau L 6470 | organic blue pigment transparent ground from BASF AG |
| Additol XL 460 | flow control agent (melamine resin, 20% in higher-boiling alcohols) from Hoechst AG |
| AC-Copolymer 405 | fixing agent for platelet-shaped pigments (polyethylene wax, soluble in organic solvents) from Nordmann U. Rassman |
| Ultramoll 1 | plasticiser from BASF AG |
| Baysilon oil OL | flow control agent (silicone oil with hydroxyl functional groups) from Bayer AG |
| GB-Ester | ester as a solvent from Hoechst AG |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. In a base lacquer useful in preparing a multi-layer lacquering comprising a layer of the base lacquer and, thereover, a layer of clear lacquer, the improvement wherein the base lacquer comprises particles of a nacreous pigment based on mica flakes coated with a metal oxide, the pigment having a particle size distribution such that at least 60% of the particles are of a diameter less than 25 $\mu$m and less than 0.5% of said particles have a diameter above 40 $\mu$m.

2. A base lacquer of claim 1 wherein at least 80% of said particles are of a diameter less than 25 $\mu$m.

3. A base lacquer of claim 1 wherein at least 60% of said particles are of a diameter in the range of 5–25 $\mu$m.

4. A base lacquer of claim 3 wherein at least 80% of said particles are of a diameter in the range of 5–25 $\mu$m.

5. A base lacquer of claim 1 wherein the nacreous pigment is based on muscovite mica coated with a rutile layer.

6. A base lacquer of claim 1 wherein the amount of said pigment is 5–30 wt. % based on the total solids content of the base lacquer.

7. In a method for lacquering a surface of an object with a multi-layer lacquering comprising a layer of a base lacquer and, thereover, a layer of clear laquer, the improvement wherein the base lacquer comprises particles of a nacreous pigment based on mica flakes coated with a metal oxide, the pigment having a particle size distribution such that at least 60% of the particles are of a diameter less than 25 $\mu$m and less than 0.5% of said particles have a diameter above 40 $\mu$m.

8. A method of claim 7 wherein at least 80% of said particles are of a diameter less than 25 $\mu$m.

9. A method of claim 7 wherein at least 80% of said particles are of a diameter in the range of 5–25 $\mu$m.

10. A method of claim 7 wherein the amount of said pigment is 5–30 wt. % based on the total solids content of the base lacquer.

11. A method of claim 7 comprising spraying both of said layers onto a surface of an automobile.

12. A method of claim 11 wherein the nacreous pigment is based on muscovite mica coated with a rutile layer.

13. A lacquered surface prepared by the method of claim 7.

14. A lacquered surface prepared by the method of claim 11.

15. A lacquered surface prepared by the method of claim 1.

16. A lacquered automobile surface prepared by the method of claim 12.

17. A base lacquer of claim 1, wherein substantially none of said particles have a diameter above 40 $\mu$m.

18. A method of claim 1, wherein substantially none of said particles have a diameter above 40 $\mu$m.

19. A base lacquer of claim 1 wherein the particles are substantially all in the size range from about 5 to 25 $\mu$m.

* * * * *